United States Patent Office 3,825,615
Patented July 23, 1974

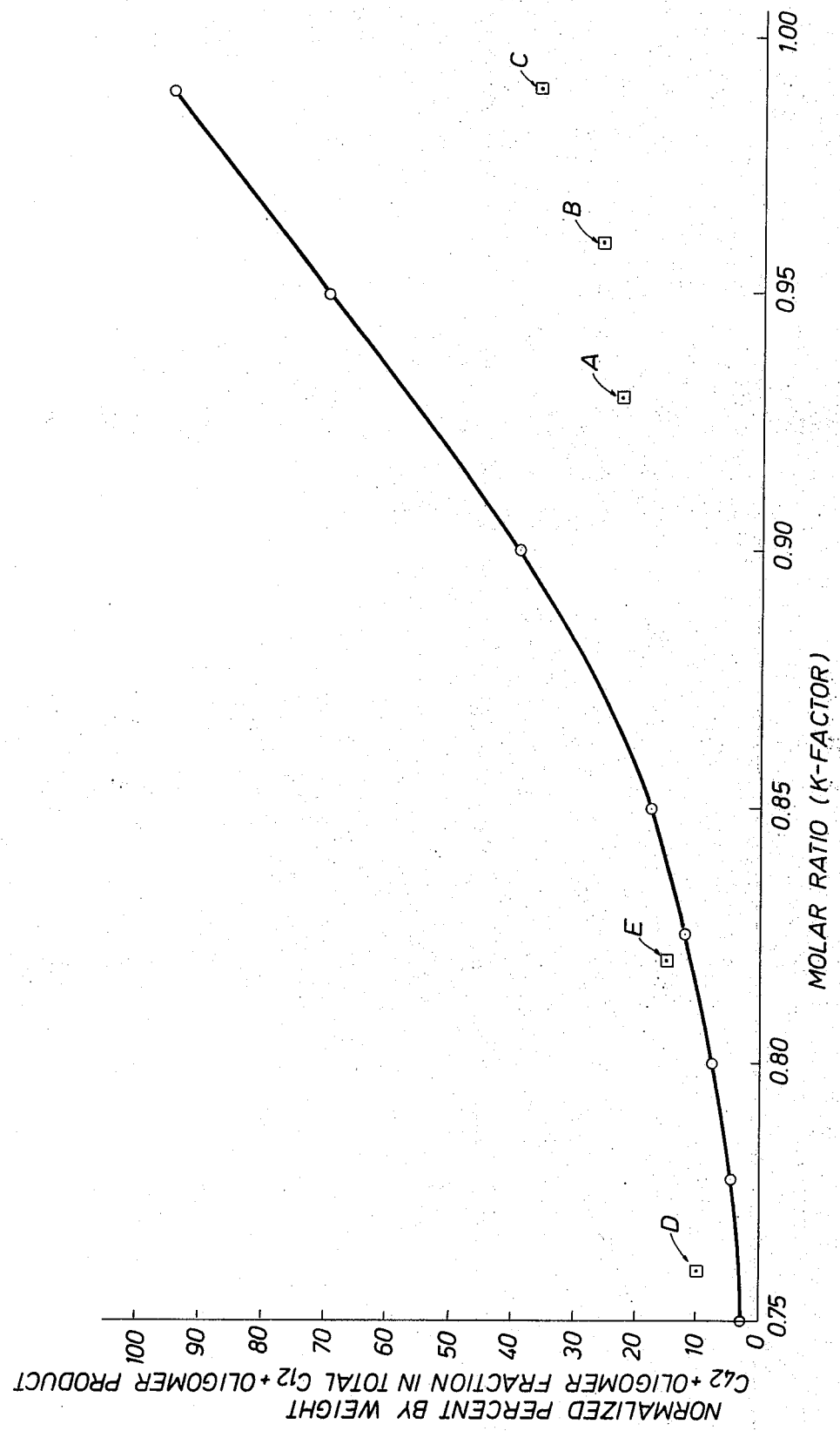

3,825,615
ETHYLENE OLIGOMERIZATION PROCESS
Eugene F. Lutz, Houston, Tex., assignor to Shell Oil Company, Houston, Tex.
Filed Sept. 24, 1973, Ser. No. 400,486
Int. Cl. C07c 3/10
U.S. Cl. 260—683.15 D                     9 Claims

ABSTRACT OF THE DISCLOSURE

A process is described for oligomerizing ethylene to a mixture of higher, linear, alpha-olefins having a molecular weight distribution which differs substantially from the geometric distribution pattern conventionally obtained in that the product is made up in large proportion of oligomers in the intermediate or $C_{12}$ to $C_{42}$ carbon number range while the relative quantity of higher oligomers of more than 42 carbon atoms is substantially reduced. This process comprises reacting ethylene in a solvent selected from the class consisting of alpha, omegaalkandiols of 4 to 7 carbon atoms and alkylene carbonates of 3 to 7 carbon atoms in the presence of a catalyst composition produced by contacting in the presence of ethylene (1) a simple divalent nickel salt, (2) a boron hydride reducing agent and (3) dicyclohexylphosphinopropionic and/or an alkali metal salt thereof.

BACKGROUND OF THE INVENTION

Field of the Invention

The present invention relates to the production of higher linear alpha-olefins by catalytic oligomerization of ethylene. More particularly, this invention is directed to a process for the production of a higher alpha-olefin product mixture which because of its molecular weight distribution is uniquely suited as a reactant source for the preparation of monoolefins within the $C_{11}$–$C_{20}$ or detergent range by disproportionation with monoolefins below the detergent range employing anyone of a variety well known olefin disproportionation processes—e.g., see U.S. Pat. No. 3,634,538 to Steffgen. The disproportionated monoolefin product in the desired molecular weight range may be hydroformylated in the presence of a conventional hydroformylation catalyst to aldehydes with simultaneous and/or subsequent reduction of most of the aldehydes to $C_{12}$–$C_{21}$ alcohols, which are useful as biodegradable synthetic detergents.

Catalytic oligomerization of ethylene to reaction products which are mixtures of ethylene oligomers (higher linear alpha-olefins of even carbon number) having carbon numbers substantially in the $C_4$ to $C_{100}$ range is a well known reaction. Among the most attractive of the catalysts or catalyst systems available for this oligomerization reaction are those systems which employ nickel ligand catalysts. In general, these nickel catalyst systems such as those described in U.S. Pats. 3,676,523 and 3,737,475 to Mason afford an oligomer product in the desired carbon number range at reaction rates which are quite acceptable and under reaction conditions readily attainable in conventional equipment while avoiding the formation of undue amounts of high molecular weight polymer. However, in the oligomerization process based on Ni ligand catalysts heretofore available, the molecular weight distribution of the oligomerization product, in terms of individual oligomers produced, has, without known exception, conformed substantially to a geometric distribution pattern. That is, over the entire range of oligomers produced, the molar ratio or mole fraction of a given oligomer component, $Cn+2$, over the one directly preceding it, $Cn$, can be expressed as a mathematical expression (hereinafter referred to as "K factor")

$$K = \frac{Cn+2}{Cn} \text{ (moles)}$$

which remains substantially constant for any given pair of oligomers, so related. Thus, in cases where ethylene oligomerization is employed in an integrated process, such as that described in U.S. Pat. 3,766,939 to Berger, wherein olefin double bond isomerization and olefin disproportionation reactions are utilized in combination with, and subsequent to, the oligomerization reaction to afford economically attractive yields of detergent range monolefins, it is essential that the oligomerization reaction conditions be controlled to give "K factors" below about 0.9. This is because of "K factors" above 0.9, the geometric distribution pattern of the oligomerization product will inherently result in an oligomer product having a disproportionate amount of higher molecular weight oligomers (oligomers containing more than 42 carbon atoms per molecule) which are extremely difficult to disproportionate to detergent range monoolefins with conventional processes and are ultimately lost as heavy end by-products of the process. However, mixtures of linear monoolefins in the intermediate molecular weight range, below about $C_{42}$ but above the desired monoolefin carbon number range, i.e., $C_{16}$–$C_{42}$ or $C_{22}$–$C_{42}$, are known to readily disproportionate with lower molecular weight monoolefins, i.e., $C_4$–$C_{10}$, to yield detergent range monoolefins, if the higher molecular weight fraction is isomerized to internal monoolefins prior to disproportionation. Thus, there are circumstances where it would be very advantageous to produce an aligomerization product having a non-geometric distribution pattern where the "K factor" steadily declines from above 0.9 at $C_{14}/C_{12}$ over the range of oligomers produced so that relatively small amounts of light ends ($C_{10}$ and lower) and heavy-ends ($C_{42}+$) are formed. An oligomerization product, having the non-geometric distribution pattern described, would allow the utilization of a much larger quantity of low value, low molecular weight linear monoolefins—e.g., butenes from an external source—in the feedstock to the disproportionation reaction where detergent range monoolefins are desired, since the net effect of the disproportionation reaction is to produce monoolefins having molecular weights which approximate the average molecular weight of the feedstock.

DESCRIPTION OF THE PRIOR ART

U.S. Pat. 3,676,523 to Mason (common assignee) describes a process whereby ethylene is oligomerized to linear, alpha-olefins by reacting ethylene in liquid phase solvent or diluent in the presence of a catalyst composition produced by contacting in the presence of ethylene (1) a simple divalent nickel salt, (2) a boron hydride reducing agent and (3) an o-dihydrocarbylphosphinobenzoic acid or alkali metal salt thereof. The liquid phase reaction solvents or diluents which one described as suitable for use in the process of this patent include polar organic solvents such as alkanediols and alkylene carbonates. Additionally, U.S. Pat. 3,737,475 to Mason (common assignee) discloses a process wherein ethylene is oligomerized to linear, alpha-olefins by reacting ethylene in a $C_2$–$C_4$ vic-alkanediol solution in the presence of a catalyst composition produced by contacting the presence of ethylene (1) a simple divalent nickel salt, (2) a boron hydride reducing agent and (3) dicyclohexylphosphinopropionic acid or alkali metal salt thereof.

While the oligomerization product distribution obtained with either of the above described processes may vary somewhat in terms of molar ratio or "K factor" depending on the specific oligomerization reaction conditions selected, the overall molecular weight distribution of oligomers obtained invariably conforms in substantial manner to the conventional geometric distribution pattern.

SUMMARY OF THE INVENTION

It has now been found that an ethylene oligomerization product having a non-geometric distribution pattern can be obtained by reacting ethylene in a solvent selected from the class consisting of alpha, omega-alkanediols of 4 to 7 carbon atoms and alkylene carbonates of 3 to 7 carbon atoms in the presence of a catalyst composition produced by contacting in a polar organic solvent in the presence of ethylene (1) a simple divalent nickel salt, (2) a boron hydride reducing agent, (3) a dicyclohexylphosphinopropionate ligand. This process affords an ethylene oligomerization product made up of a mixture of higher, linear alpha-olefins having a molecular weight distribution pattern which is non-geometric in that the molar ratio or "K factor" for those ethylene oligomers produced steadily declines with increasing molecular weight. The present invention provides a ready means of obtaining a mixture of higher, linear, alpha-olefins directly from ethylene which is made up in large proportion of alpha-olefins in the $C_{12}$ to $C_{42}$ range while the relative quantity of alpha-olefins of more than about 42 carbon atoms is substantially reduced from that characteristic of ethylene oligomerization products having geometric distribution patterns.

The invention is further illustrated by referring to FIG. I which depicts the relationship between molar ratio or "K factor" (measured for the $C_{12-24}$ oligomer fraction) and the weight percent of the total oligomerization product occurring as heavy ends, i.e., composite of individual oligomers having more than 42 carbon atoms per molecule. This figure shows, in curve form, the weight percent heavy ends or $C_{42}+$ fraction characteristic of oligomerization products having conventional geometric distribution patterns together with the average weight percent heavy ends obtained with oligomerizations carried out both according to the invention (points A, B and C) and not according to the invention (points D and E) as described in the specific embodiments below.

DESCRIPTION OF THE PREFERRED EMBODIMENTS

Nickel Salts

In general, any simple divalent nickel salt can be employed for preparing the catalyst composition of the invention provided the nickel salt is sufficiently soluble in the reaction medium. By the term "simple divalent" nickel salt is meant a nickel atom having a formal valence of +2 and bonded through ionic or electrovalent linkages to two single charged anionic groups (e.g., halides) or to one doubly charged anionic group (e.g., carbonate) and not complexed with or coordinated to any other additional molecular or ionic species with the exception of waters of hydration. Simple divalent nickel salts therefore do not encompass complex divalent nickel salts which are bonded to one or two anionic groups and additionally complexed or coordinated to neutral chelating ligands or groups such as carbon monoxide and phosphines. However, simple divalent nickel salts are meant to include nickel salts containing water of hydration in addition to one or two anionic groups.

In most instances, a simple divalent nickel salt with a solubility in the reaction diluent or solvent employed for catalyst preparation of at least 0.0005 mole per liter (0.0005 M) is satisfactory for use as the nickel catalyst precursor. A solubility in the reaction diluent or solvent of at least 0.001 mole per liter (0.001 M) is preferred, and a solubility of at least 0.005 mole per liter (0.005 M) is most preferred. Reaction diluents and solvents suitably employed for catalyst preparation are polar organic solvents including the primarily dihydric alkanol and alkylene carbonate solvents employed for the oligomerization process which are defined below.

Suitable simple divalent nickel salts include inorganic as well as organic divalent nickel salts. Illustrative inorganic nickel salts are nickel halides such as nickel chloride, nickel bromide and nickel iodide, nickel carbonate, nickel chlorate, and nickel nitrate. Illustrative organic divalent nickel salts are nickel salts of carboxylic acids such as nickel alkanoates of up to 10 carbon atoms, preferably of up to 6 carbon atoms, e.g., nickel formate, nickel acetate, nickel propionate, nickel hexanoate and the like; nickel oxalate, nickel benzoate and nickel naphthenate. Other suitable organic salts include nickel benzenesulfonate, nickel citrate, nickel dimethylglyoxime and nickel acetylacetonate.

Nickel halides, especially nickel chloride, and nickel alkanoates, especially nickel acetate, in part because of their availability at low cost and solubility in polar organic solvents, are preferred nickel salts.

Phosphinopropionic Acid Ligand

The dicyclohexylphosphinopropionate ligands employed in the preparation of the catalyst composition of the invention are described by the structural formula

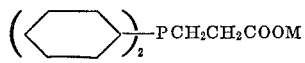

wherein M is hydrogen or an alkali metal, preferably sodium or potassium. These ligands are known compounds and are prepared by conventional methods such as the reaction of dicyclohexylphosphine with methyl acrylate to yield an ester intermediate which can be subsequently treated with a base to afford the desired phosphino salt. Although the dicyclohexylphosphinopropionate catalyst precursor is suitably employed as the free acid, better results are obtained with the alkali metal salts of the phosphinopropionic acid.

When preparing the catalyst, the molar ratio of nickel to propionate ligand (free acid or salt thereof) may suitably range from 0.2:1 up to 5:1. Preferred molar ratios of nickel salt to propionate ligand (free acid or salt thereof) range from 0.5:1 to 2:1, although molar ratios of about 0.5:1 to 1.5:1 are most preferred.

Boron Hydride Reducing Agent

In general, any boron hydride salt reducing agent of reasonable purity is suitable for use in the process of the invention. Specific examples include alkali metal borohydrides such as sodium borohydrides, potassium borohydride and lithium borohydride; alkali metal alkoxyborohydrides wherein each alkoxy has 1-4 carbon atoms, such as sodium trimethoxyborohydride and potassium tripropoxyborohydride and tetraalkylammonium borohydrides wherein each alkyl has 1-4 carbon atoms, such as tetraethylammonium borohydride. Largely because of commercial availability, alkali metal borohydrides are preferred and especially preferred is sodium borohydride.

When preparing the catalyst, the molar ratio of boron hydride salt to nickel salt is at least 0.5:1. There does not appear to be a definite upper limit on the boron hydride/nickel ratio, but for economic reasons it is especially preferred that the molar ratio be not greater than about 15:1. The preferred molar ratio of boron hydride to nickel salt is usually between about 1:1 and about 2:1. Best results are often obtained when the molar ratio is about 1:1.

Catalyst Preparation

The catalyst composition of the present invention is suitably preformed by contacting the catalyst precursors, i.e., the nickel salt, the dicyclohexylphosphinopropionate ligand and the boron hydride reducing agent, in a polar organic diluent or solvent, e.g., polar organic diluents or solvents which are not reduced by the boron hydride reducing agent to any substantial degree and include the alpha, omega-alkanediol solvents employed in the oligomerization process. In a preferred modification, the solvent, the nickel salt and the propionate ligand are contacted in the presence of ethylene before the addition of the boron hydride reducing agent. In order to obtain the improved catalyst of the invention, it is essential that the catalyst composition is preferred in the presence of the ethylene reactant. Generally, the catalyst components are contacted under 10 to 1500 p.s.i.g. of ethylene.

By any modification, the catalyst is generally prepared at temperatures of about 0° C. to 150° C., although temperatures in the range of 10–90° C. are preferred. Contact times of about 5 minutes to 1 hour are generally satisfactory.

Reaction Conditions

The ethylene is contacted with the catalyst composition in the liquid phase in the presence of a reaction solvent selected from the class consisting of primary dihydric alkanols of 4 to 7 carbon atoms and alkylene carbonates of 3 to 7 carbon atoms. Amounts of reaction solvent of up to 30 liters per mole of ethylene are satisfactorily employed. Generally, the concentration of the catalyst (calculated as parts per million of ligand in the reaction solvent) is at least 100 p.p.m. and may suitably range as high as 500 p.p.m. depending on the reaction rate desired.

However, catalyst concentrations of about 300 to about 2000 p.p.m. are preferred with catalyst concentrations of from about 500 to about 1000 p.p.m. being most preferred.

The alpha, omega-alkandiol solvents contemplated for use in the process of the invention may be otherwise described as n-alkanediols of 4 to 7 carbon atoms wherein the hydroxy moieties are attached to the terminal carbon atoms of the alkane chain. Suitable alpha, omega-alkandiols include 1,4-butanediol, 1,5-pentanediol, 1,6-hexanediol and 1,7-heptanediol. Of the alpha, omega-alkandiol solvents described 1,4-butanediol and 1,5-pentanediol are preferred. The alkylene carbonate solvents employed in the process of the invention include those carbonic esters conventionally derived from the reaction of carbon dioxide with a 1,2-epoxide of 2 to 6 carbon atoms. Suitable alkylene carbonates include ethylene carbonate, 1,2-propylene carbonate, 1,2-butylene carbonate, 1,3-butylene carbonate, 1,2-carbonatohexane and 1,3-carbonatoheptane. Preferred alkylene carbonates include ethylene carbonate and 1,2-propylene carbonate. When the alpha, omega-alkandiol or alkylene carbonate solvents described above, are utilized as reaction solvents in the process, a two phase reaction mixture is formed, in part, because the ethylene oligomerization product mixture is essentially insoluble in the solvent. For example, when 1,4-butanediol is employed as reaction solvent, a two phase reaction mixture is formed, i.e., one phase comprising the ethylene aligomerization product mixture, i.e., the alpha-olefins, and a second phase comprising the nickel catalyst and the 1,4-butanediol solvent. This is advantageous because when a two phase reaction mass is formed, the ethylene oligomerization product phase can be separated and the catalyst containing diluent or solvent phase can be recycled to the reaction zone and be utilized for further ethylene oligomerization.

The precise method of establishing ethylene/catalyst contact during the oligomerization reaction is not critical. In one modification, the catalyst composition and the solvent are charged to an autoclave or similar pressure reactor, the ethylene is introduced, and the reaction mixture is maintained with agitation at reaction temperature and pressure for the desired reaction period. Since with the reaction solvents of this invention a two phase reaction is formed, it is quite convenient to employ a continuous reaction system wherein ethylene is passed in a continuous manner into a reaction zone containing the catalyst composition and the diluent while ethylene oligomerization product mixture which is produced is concomitantly withdrawn from the reaction zone.

By any modification, the oligomerization process is conducted at moderate temperatures and pressures. Suitable reaction temperatures vary from about 80° C. to 150° C. but preferably from about 90° C. to 120° C. The reaction is conducted at or above atmosphere pressure. The precise pressure is not critical so long as the reaction mixture is maintained substantially in a liquid phase. Typical pressures vary from about 500 p.s.i.g. to 2500 p.s.i.g. with the range from about 1100 p.s.i.g. to 2000 p.s.i.g. being preferred.

The oligomerization products are separated and recovered from the reaction mixture by conventional methods such as fractional distillation, selective extraction, absorption and the like. The reaction solvents, catalyst and any unreacted ethylene are recycled for further utilization.

While, as noted above, the oligomerization product of the process of the invention can be recovered by any conventional separation method, the desired effect of the process—i.e., production of an oligomerization product having a non-geometric distribution pattern previously described—as optimized by removing the oligomer product from contact with any significant quantity of catalyst as soon as possible. This is because it appears that the catalyst system employed in the process of the invention has some activity for dimerizing or polymerizing higher molecular weight olefins. Thus, undue contact between the oligomerization product and the catalyst will lead to some measurable increase in the relative quantity of higher oligomers ($C_{42}+$) or heavy ends in the product. Accordingly it is preferable to recover the oligomerization product by a separation scheme wherein the oligomer product is immediately separated from a major portion of the catalyst charge—e.g., by conducting the oligomerization reaction in a continuous manner wherein the oligomer product is removed from the reaction mixture as it is formed by continuous phase separation and then washing it with reaction solvent.

Illustrative Embodiments I–V

To illustrate the invention a series of comparative ethylene oligomerization reactions were carried out by reacting nickel chloride hexahydrate ($NiCl_2 \cdot 6H_2O$), potasssium salt of dicyclohexylphosphinopropionic acid, sodium borohydride and ethylene in a reaction solvent or medium as follows:

(a) According to the invention, the catalyst composition and ethylene were reacted together in an alpha, omega-alkandiol solution or an alkylene carbonate solution of the invention;

(b) Not according to the invention, the catalyst composition and ethylene were reacted together in a reaction medium comprising alkanediol solvents (ethylene glycol or a mixture of ethylene glycol and propylene glycol) not within the class of solvents of the invention.

Each reaction was conducted by charging 2 to 6 millimoles of $NiCl_2 \cdot 6H_2O$, 2 to 6 millimoles of propionate ligand and 1200 to 1350 g. of the various solvents or solvent mixtures to a 4 liter Magnedrive autoclave maintained at atmospheric pressure under inert gas or ethylene atmosphere. The autoclave was then charged with about 500 p.s.i.g. ethylene pressure and then 2 to 7 millimoles of sodium borohydride (about 0.4 molar aqueous solution) which is made up and used immediately, was added to the reaction solution. The autoclave was maintained at 25° C. for 20 minutes and then heated to 100–130°° C. and maintained at a constant ethylene pressure of either 1100 or 1400 p.s.i.g. by continual addition of ethylene. The reactions were allowed to continue for periods of time ranging from 2 to 6 hours and about 25–150 g. samples of the oligomer phase in the reactor were withdrawn at periodic intervals during the course of the reaction to determine the oligomer product distribution. The results of this series of ethylene oligomerization reactions are recorded in Table I as runs 1 to 5 along with the pertinent reaction conditions and parameters for each run. The nickel chloride concentration in each reactor is calculated as p.p.m. of nickel in the solvent. Likewise, the ligand concentration in each reaction is calculated as p.p.m. of ligand in the solvent. The value for reaction rate which is recorded in the table at periodic intervals over the course of the reaction for selected ethylene oligomerization runs according to the above procedure is based on average ethylene uptake by the reaction system in grams of ethylene per liter of catalyst phase per hour. The results of each oligomerization reaction in terms of the molecular weight distribution of individual oligomers in the products obtained are expressed in the table in the following manner. Firstly, values are given in percent by weight of the total oligomer product, normalized to $C_{12}$ weight heavy ends obtained from ethylene oligomerizations according to the invention (runs 1, 2 and 3, respectively in Table I below) whereas points D and E represent the corresponding values obtained from ethylene oligomerizations not according to the invention (runs 4 and 5, respectively in Table I, below). From this graphic illustration it is apparent that ethylene oligomerization reactions carried out according to the process of the invention afford oligomerization products whose heavy end content is substantially reduced from that inherent in oligomerization products having geometric distribution patterns.

TABLE 1

| Run No. | Reaction Solvent | Temp., °C. | Mole ratio Nickel/ligand | Mole ratio NaBH₄/ligand | Nickel conc. (p.p.m.) | Ligand conc. (p.p.m.) | Initial reaction rate, g, ethylene/1-catalyst phase/hour | factor, $C_{12}-C_{24}$ | Actual product distribution, normalized percent by weight | | | Theoretical, normalized percent wt. $C_{42}+$ for geometric distribution pattern (based on K factor) |
|---|---|---|---|---|---|---|---|---|---|---|---|---|
| | | | | | | | | | $C_{12}-C_{20}$ | $C_{22}-C_{42}$ | $C_{42}$ | |
| 1 | 1,4-butanediol | 110 | 1.11 | 1.12 | 186 | 879 | 215 | 0.93 | 23.9 | 52.2 | 23.9 | 56 |
| 2 | 1,5-pentanediol | 110 | 1.11 | 1.11 | 188 | 894 | 804 | 0.96 | 19.8 | 54.4 | 25.8 | 76 |
| 3 | Propylene carbonate | 110 | 1.10 | 1.12 | 187 | 885 | 154.8 | 0.99 | 17.2 | 46.7 | 36.1 | 95 |
| 4 | Ethylene glycol | 130 | 1.00 | 1.07 | 120 | 626 | | 0.76 | 50.8 | 39.2 | 10.0 | 3 |
| 5 | 1:1 ethylene glycol: propylene glycol | 110 | 0.99 | 1.08 | 120 | 634 | 103 | 0.82 | 42.0 | 42.6 | 15.4 | 11 | and higher, for alpha-olefin fractions containing oligomers having a number of carbon atoms per molecule ranging from 12 to 20, 22 to 42 and more than 42. These normalized percent by weight values are average values derived from the several samplings taken over the course of the reaction and are calculated as percentage values based on the total weight of those oligomer components having 12 or more carbon atoms per molecule with the $C_{10}$ and lower being disregarded. The oligomer molecular weight distribution is also expressed in terms of molar ratio or "K factor." As utilized in the table, the "K factors" are obtained by averaging the ratios of the moles of an oligomer of $Cn$ carbon atoms to the moles of the next higher oligomer of $Cn+2$ carbon atoms present in the product according to the mathematical expression:

$$K = \frac{Cn+2}{Cn} \text{ (moles)}$$

over a series of carbon numbers wherein the lowest carbon number of $Cn$ is 12 and the highest carbon number for $Cn+2$ is 24. Both the normalized percent by weight and the "K factor" values are derived from a gas-liquid chromatographic analysis of the oligomer product which determines the quantities of each individual oligomer, e.g., $C_{12}$, $C_{14}$, $C_{16}$, of the entire molecular weight range of oligomers having more than 12 carbon atoms per molecule present in the product.

For comparative purposes, an approximate theoretical normalized percent by weight value is given in the table for the $C_{42}+$ or heavy end fraction which would be expected based on the "K factor" observed for the $C_{12-24}$ fraction, if the molecular weight distribution of the total oligomerization product conformed to the conventional geometric distribution pattern. This is a calculated value based on the assumption that, at least in theory, for a true geometric distribution pattern to obtain, the mathematical expression $$K = \frac{Cn+2}{Cn}$$

or "K factor" (see above) must remain constant for any given pair of oligomers so related, over the entire range of possible oligomers. This same relationship is illustrated in graphic form in FIG. I. In this figure, the curve represents the theoretical, normalized percent weight heavy ends or $C_{42}+$ oligomer fraction which would be obtained for an ethylene oligomerization product having a geometric distribution pattern at different geometric ratios or "K factors" in the 0.75 to 0.99 range. Points A, B and C in this figure represent the average normalized percent

I claim as my invention:

1. A process of oligomerizing ethylene to linear, alpha-olefins by reacting ethylene in a solvent selected from the class consisting of alpha, omega-alkanediols of 4 to 7 carbon atoms and alkylene carbonates of 3 to 7 carbon atoms at a temperature of about 90° C. to 150° C. in the presence of a catalyst composition produced by contacting in a polar organic solvent in the presence of ethylene (1) a simple divalent nickel salt having a solubility of at least 0.005 mole per liter in said polar organic solvent, (2) a boron hydride reducing agent and (3) a dicyclohexylphosphinopropionate ligand represented by the formula

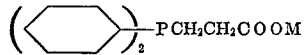

wherein M is hydrogen or alkali metal, the molar ratio of nickel salt to ligand being from about 0.2:1 to 5:1.

2. The process of claim 1 wherein the solvent employed in the ethylene oligomerization reaction is an alpha, omega-alkandiol of 4 to 7 carbon atoms.

3. The process of claim 2 wherein the alpha, omega-alkandiol solvent is selected from the class consisting of 1,4-butanediol and 1,5-pentanediol.

4. The process of claim 3 wherein the catalyst composition is produced in the presence of about 10 p.s.i.g. to 1500 p.s.i.g. of ethylene at a temperature of about 0° to 150° C.

5. The process of claim 4 wherein the nickel salt has a solubility of at least 0.005 mole per liter in polar organic solvent employed for catalyst preparation.

6. The process of claim 4 wherein the catalyst is prepared in the same solvent as is employed in the ethylene oligomerization reaction.

7. The process of claim 6 wherein boron hydride reducing agent is an alkali metal borohydride, the molar ratio of alkali metal borohydride to nickel salt is about 0.5:1 to 15:1 and M is hydrogen, sodium or potassium.

8. The process of claim 7 wherein the nickel salt is a nickel halide.

9. The process of claim 8 wherein the boron hydride reducing agent is sodium borohydride, the nickel salt is nickel chloride and M is potassium.

References Cited

UNITED STATES PATENTS 3,686,351 8/1972 Mason _____ 260—683.15 D
3,737,475 6/1973 Mason _____ 260—683.15 D PAUL M. COUGHLAN, Jr., Primary Examiner U.S. Cl. X.R.

260—683 D